United States Patent [19]

Cox et al.

[11] Patent Number: 4,714,407
[45] Date of Patent: Dec. 22, 1987

[54] AEROFOIL SECTION MEMBERS FOR TURBINE ENGINES

[75] Inventors: John C. Cox; Stephen E. Morgan; Martin Hamblett; Alfred Rubini, all of Derby, England

[73] Assignee: Rolls-Royce plc, London, England

[21] Appl. No.: 757,260

[22] Filed: Jul. 22, 1985

[30] Foreign Application Priority Data

Sep. 7, 1984 [GB] United Kingdom ............... 8422662

[51] Int. Cl.$^4$ .................. F04D 29/24; F04D 29/54
[52] U.S. Cl. .................. 415/192; 415/DIG. 1; 416/223 A; 416/DIG. 2
[58] Field of Search ............ 415/181, 119, 191–195, 415/DIG. 1; 416/DIG. 2, 223 R, 223 A, 242, 243

[56] References Cited

U.S. PATENT DOCUMENTS

| 4,131,387 | 12/1978 | Kazin et al. ............ 416/223 A X |
| 4,284,388 | 8/1981 | Szewalski .............. 416/223 A |
| 4,470,755 | 9/1984 | Bessay ................ 415/DIG. 1 X |
| 4,504,189 | 3/1985 | Lings ................. 415/192 X |

FOREIGN PATENT DOCUMENTS

| 2144600 | 3/1973 | Fed. Rep. of Germany ... 416/223 A |
| 57-99211 | 6/1982 | Japan .................. 416/223 A |
| 908748 | 10/1962 | United Kingdom ........ 416/DIG. 2 |

Primary Examiner—Robert E. Garrett
Assistant Examiner—Joseph M. Pitko
Attorney, Agent, or Firm—Cushman, Darby & Cushman

[57] ABSTRACT

To minimize secondary losses and flow maldistribution, an aerofoil such as a gas turbine nozzle guide vane, is designed so that in the throat defined by the trailing edge of one aerofoil and the flank of the adjacent aerofoil, the local gas flow streamlines are normal to the trailing edge of the aerofoil at the point of intersection.

17 Claims, 24 Drawing Figures

For Orthogonality
$$\tan\theta + \tan\lambda = \tan\alpha \tan\phi$$
For multilean $\tan\phi = 0$
$$\therefore \tan\theta = -\tan\lambda$$

Flow:—
  $\lambda$ local radial angle
  $\alpha$ local whirl angle in the plane

Trailing Edge
  $\theta$ axial lean (local)
  $\phi$ tangential lean (local)

AEROFOIL SECTION MEMBERS FOR TURBINE ENGINES

This invention relates to aerofoil section members which are commonly used in gas, or other fluid turbine engines. These members include the rotor blades and stator vanes of the turbine or turbines of a turbine engine. The invention is also applicable in a modified form to the blades and vanes of an axial compressor.

The function of the turbine rotor blades is to extract energy from the high temperature, high velocity motive gases in as efficient manner as possible, to rotate the turbine and associated compressor, or propellor, or any other energy absorbing system as the case may be. Likewise the stator vanes receive the motive gases and transmit the gases in the correct direction onto the downstream rotor blade row, if present.

For the sake of convenience, the term aerofoil in this specification shall be taken hereafter to include both rotor blades and stator vanes.

The energy exchange and transmission is subject to thermodynamic, aerodynamic and mechanical losses. The aerodynamic losses include losses due to secondary flows in the passages between adjacent vanes.

Secondary flows for the purpose of this invention are treated as those flows having velocity vectors which differ substantially from the intended principal flow vectors of the motive gas. These flows can pass between the suction and pressure surfaces of adjacent aerofoils in the circumferential direction and between the aerofoil roots and tips in the radial sense, and are caused by static pressure differentials in adjacent aerofoil passages.

The passageways through which the motive gases flow are defined by the pressure and suction surfaces of adjacent aerofoils and by inner and outer annulus boundary walls extending in the circumferential and axial directions. Either or both of these boundary walls can be inclined to produce a passageway of constant radial depth, or varying radial depth, this characteristic being known as annulus flare or geometric hade.

Each aerofoil may have a built in twist from root to tip, the purpose of which is to distribute the gas flow to do prescribed work at the various spanwise positions.

The combination of blade twist and annulus flare generally result in a passageway of complex shape. The mean streamline associated with this passageway may lie on any general surface of revolution, as opposed to lying on a simple cylindrical surface. The cross-sectional shape of this passageway taken normal to this means streamline may vary in shape from inlet to exit.

The combination of twist and annulus flare result in a passageway which is not generally a simple constant section in the axial and circumferential directions but has a component in the radial direction, the passageway being twisted in the direction of gas flow and varying cross-section shape from inlet to exit. Achievement of design distribution of flow can be assisted, and secondary flows discouraged by arranging that the angle between the boundary and aerofoil walls is 90°, thus ensuring that the aerofoil force which acts normal to the aerofoil walls does not generate any component divergent from the intended principal flow direction of the gas.

It has been the practice to design aerofoils by laying surfaces over a number of elemental aerofoil sections which have been stacked one on top of another about some near radial stacking axis. The individual sections have been shaped to suit local aerodynamic requirements and to produce sensibly straight leading and trailing edges of the aerofoils when the sections are stacked. The resulting pressure and suction surface shapes usually have little curvature or lean in the radial and axial senses. Aerofoils designed in this manner have functioned in an acceptably efficient manner but suffer deviations from the intended gas flow distribution and produce more than the minimum level of secondary flow fundamental to turning the gas. The result is a significant, unnecessary loss of efficiency.

With the rising cost of fuel, it has become increasingly important to produce more efficient engines in order to reduce fuel consumption. Efficiency can be improved by improving the efficiency of various components of the engine, e.g. the aerofoils.

The present invention seeks to provide an aerofoil having an improved component efficiency due to better control of flow distribution and reduction in the generation of secondary flows.

It is proposed to alter the shape of the passageways to minimise unwanted redistribution of flow and the secondary flows by changing the manner of designing the aerofoils which define the passageways.

It is proposed that the elemental aerofoil sections are stacked so that in at least one arrangement the boundary walls are substantially normal to the aerofoil trailing edge and adjacent aerofoil surfaces.

In particular, the trailing edges of the aerofoil sections which make up the aerofoil can be arranged so that each trailing edge section is normal to the local flow streamline of the motive gases. Within this context, the aerofoil sections can be stacked in various ways.

The aerofoil sections can be stacked so that the section trailing edges are staggered in a radial plane which contains the engine axis. Such an arrangement will produce an aerofoil having a trailing edge which is curved probably in side elevation, i.e. in the axial sense, and pressure and suction surfaces which are curved probably in front elevation, i.e. in the radial sense.

The section trailing edges can also be stacked in a plane which is normal to the engine axis. This arrangement produces an aerofoil which probably has a curved trailing edge with local streamlines normal to the trailing edge when viewed in a direction parallel to the plane containing the geometric throat of the aerofoil passageway. The trailing edge will be virtually straight in the axial sense apart from the junctions with the boundary walls, and the pressure and suction surfaces will be curved probably in the radial sense.

The section trailing edges can also be stacked in any plane which is between the planes containing the engine axis and the plane normal to the engine axis. This arrangement will also probably produce an aerofoil having a trailing edge which is normal to the local flow streamlines in a direction normal or nearly normal to the surface of the aerofoil at the trailing edge.

Accordingly in its broadest sense, the present invention provides an aerofoil for a gas turbine engine, the aerofoil having an aerodynamic profile defined by a number of elemental aerofoil sections stacked relatively to one another, the trailing edges of the elemental aerofoil sections being arranged to define the trailing edge of the aerofoil, the trailing edge forming one boundary of the geometric throat between adjacent aerofoils in an array of aerofoils, the local streamlines of the gas flow through the throat being normal to the aerofoil trailing edge at the point of intersection.

The trailing edges of the elemental aerofoil sections can be stacked in a radial plane which contains the engine longitudinal axis, in a plane normal to the engine longitudinal axis, or in a plane which lies between the plane containing the engine longitudinal axis and a plane normal to the engine longitudinal axis.

Depending upon the mode of stacking the trailing edges of the elemental aerofoil sections, the aerofoil trailing edges will probably be curved in the axial, or radial directions or both the axial and the radial directions.

It is possible not only for the local flow streamlines to be normal to the trailing edge as defined above but also the local flow stream planes in a surface of revolution containing the stream lines considered.

In addition the aerofoil leading edge can be curved in the axial, or radial directions.

The invention can be applied to static and rotatable aerofoils and is particularly applicable to turbine nozzle guide vanes, turbine rotor blades and turbine stator vanes, In the case of turbine rotor blades the degree of curvature, whether axial, radial or both will be limited as compared with stator vanes, because of stressing limitations.

The present invention will now be more particularly described with reference to the accompanying drawings in which.

FIGS. 11A to 11E are similar views to those shown in FIGS. 10A to 10E of a further aerofoil according to the present invention, FIGS. 12A to 12E are similar views to those shown in FIGS. 10A to 10E of another aerofoil according to the present invention, Referring to FIG. 1, a current gas turbine engine 10 comprises a fan 12 driven by a low pressure turbine 14 through a shaft 16, an intermediate pressure compressor 18 driven by an intermediate pressure turbine 20 through a shaft 22, and a high pressure compressor 24 driven by a high pressure turbine 26 through a shaft 28. A combustion apparatus 30 burns fuel with the delivery from the high pressure compressor to provide the motive gases for the turbines 26, 20 and 14.

Figure 1:
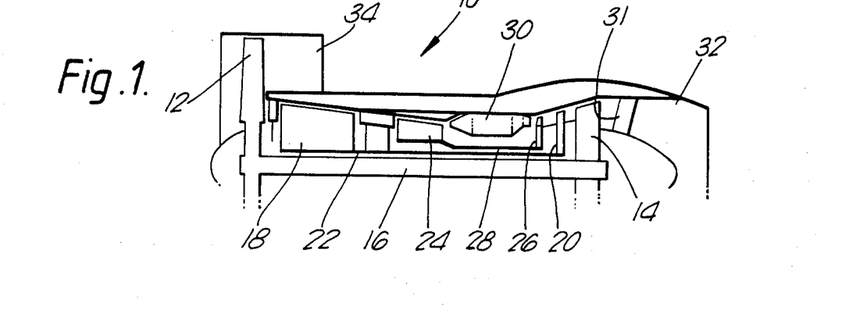
FIG. 1 is a diagrammatic view of a gas turbine engine to which the present invention can be applied.

The hot gases flow between outlet guide vanes 31 and are exhausted through a nozzle 32 which provides part of the propuslive force. The major propuslive force is provided by the large mass of relatively slow moving air exhausted from a fan nozzle 34.

In order to avoid maldistribution of gas flows and secondary flows in relation to the blades and vanes of the turbines it is desirable that the boundary walls and aerofoil surfaces are normal to one another, and that the aerofoil trailing edges are correctly orientated in space to meet two particular requirements. Firstly, in order to optimise performance, ordinarily the passages between adjacent aerofoils should normally not be of the convergent-divergent type i.e., the throat geometric orthogonals at spanwise locations should intersect the trailing edge, an orthogonal being defined as a line drawn normal to the mean flow stream line lying substantially in the stream plane.

Secondly, the elemental aerofoil sections should be stacked so that the resulting geometric throat area between the aerofoils is so orientated in space that the flow streamlines leave the throat in the desired design direction.

In turbine aerofoils, if these two conditions are met, which define the condition known as trailing edge orthogonality, it then follows that the aerofoil trailing edge will bound one side of the geometric throat window.

Figure 4:
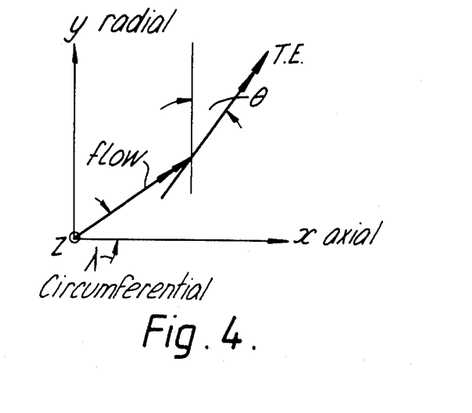
FIGS. 4, 5 and 6 are diagrams illustrating the sign definition and nomenclature used in relation to aerofoils according to the present invention.
Figure 5:
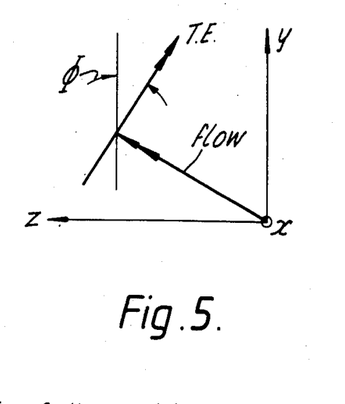
Figure 6:
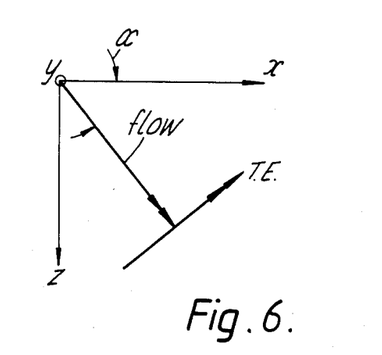

FIGS. 4, 5 and 6 show the sign definition of the flow, and the aerofoil trailing edge directions in the X-Y, Z-Y and X-Z planes. In order that each element of the trailing edge should form one edge of the geometric throat window and be normal to the local streamline flow vector, then the flow streamline orthogonality condition applies so that $$\tan\theta + \tan\lambda = \tan\alpha_p \tan\Phi \qquad \text{(Equation 1)}$$

where
$\theta$ = local axial lean angle of trailing edge
$\psi$ = local tangential lean angle of trailing edge
$\lambda$ = local radial angle of the gas flow
$\alpha$ = local whirl angle in the plane of the gas flow, furthermore, in order to limit secondary flows it is necessary to control radial pressure gradients which act on the flow in the passage. To this end, the surfaces of the aerofoils should be oriented in space such that they are normal to the predicted local streamplane in the passage. As a consequence, the additional stream sheet orthogonality condition at the trailing edge must be satisfied, i.e.

$$\theta = -\lambda \qquad \text{(Equation 2),}$$

combining equations (1) and (2), $\Phi = 0$

Elements of the geometric throat window when developed and viewed on a plane may then be described as being substantially rectangular in shape.

Similar conditions apply at other passage cross-sections which are desired to be as rectangular in shape as possible. Thus, for an approximately rectangular passage at the aerofoil leading edge, the leading edge must have a zero tangential lean, and have an axial lean of opposite sign to the local streamline.

Aerofoils of the static type, known as nozzle guide vanes or stator vanes are usually stacked on the trailing edge and may be stacked to meet the trailing edge orthogonality conditions. It is more difficult but not necessarily impossible to meet these conditions for aerofoils of the rotor type, known as rotor blades, these blades usually being stacked through the centroid on a near radial line in order to balance the centrifugal and gas loads.

The stacking of the elemental aerofoil sections is subject not only to meeting the trailing edge orthogonality condition and/or the rectangular or near rectangular passage condition, but also one or more of the following considerations:
(a) the provision of internal cooling tubes and other cooling features,
(b) the need to fit load bearing structures and service ducting through the vanes
(c) manufacturing requirements
(d) stress requirements
(e) vibration requirements The trailing edge orthogonality (equations (1) and (2)) should preferably be satisfied for each elemental throat window area which often results in the trailing edges being curved, as illustrated diagrammatically in FIG. 3. In this case both stator and rotor aerofoils 36, 38 respectively have curved leading and trailing edges and the throat window between circumferentially adjacent aerofoils is substantially rectangular in shape.

Figure 3:
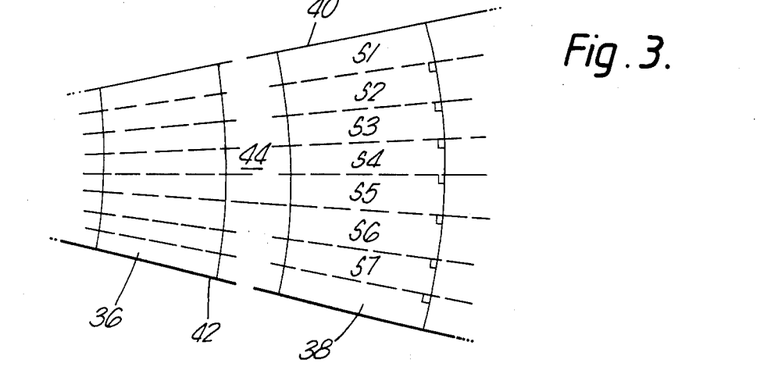
FIG. 3 is a diagrammatic side elevation of a turbine incorporating one form of aerofoil according to the present invention.

The stator and rotor aerofoils form part of the turbine of the gas turbine engine 10. An outer annulus boundary wall 40, are an inner annulus boundary wall 42 define an annular flow passage 44 for the throughflow of motive gas. The lines $S_1$, $S_2$ etc are all streamlines which lie on circumferentially and axially extending streamplanes.

Figure 2:
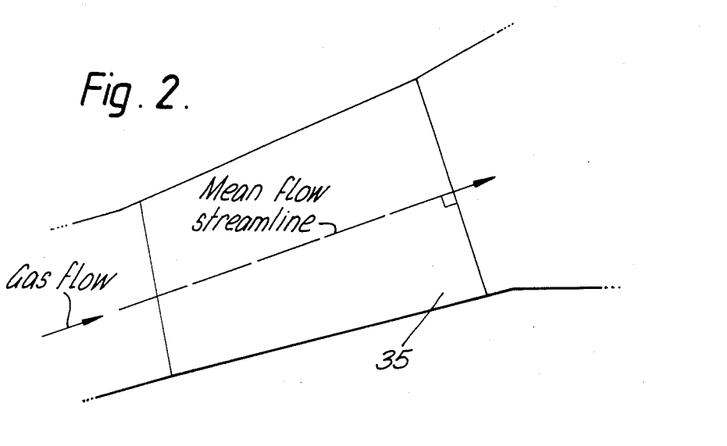
FIG. 2 shows a basic form of the present invention applied to a nozzle guide vane.

The streamlines all intersect the trailing edges of the stator and rotor aerofoils 36, 38 at an angle of 90°, or near 90°, over substantially the whole span of the aerofoils. The leading edges of the aerofoils are also curved in a similar fashion to the trailing edges, this is preferred but not essential. If the flow streamlines do not have an appreciable radial component, it may be possible for the aerofoils to have only a straight trailing edge inclined axially so that the mean flow-stream line is normal to the trailing edge. Such an arrangement is shown in FIG. 2 in which a nozzle guide vane 35 has a straight trailing edge inclined so as to be normal to the mean flow streamline. The geometric throat window between adjacent vanes 35 is approximately rectangular. If the preset invention is not embodied in a turbine arrangement having a substantial hade and in which the flow streamlines have appreciable local radial flow components, then it is believed that loss of performance could occur.

For example, an arrangement comprising an aerofoil having straight leading and trailing edges both of which lie or purely radial lines is positioned between the annulus boundary walls. The inner wall diverges at a greater rate than the outer wall, and the streamlines nearer the inner wall are more divergent from the normal to the trailing edge than those nearer the outer wall.

The effects of such an arrangement could give rise to two adverse conditions, either separately or together. An upstream throat might be formed indicating that the trailing edge no longer defines one edge of the throat window and that thus the streamtube passageway has become convergent/divergent. This will probably cause a loss in efficiency.

The gas flow may not leave the aerofoils with the streamline direction intended and this could result in flow separation and flow disturbance, leading to loss of efficiency.

Figures 10A, 10B, 10C, 10D, 10E:
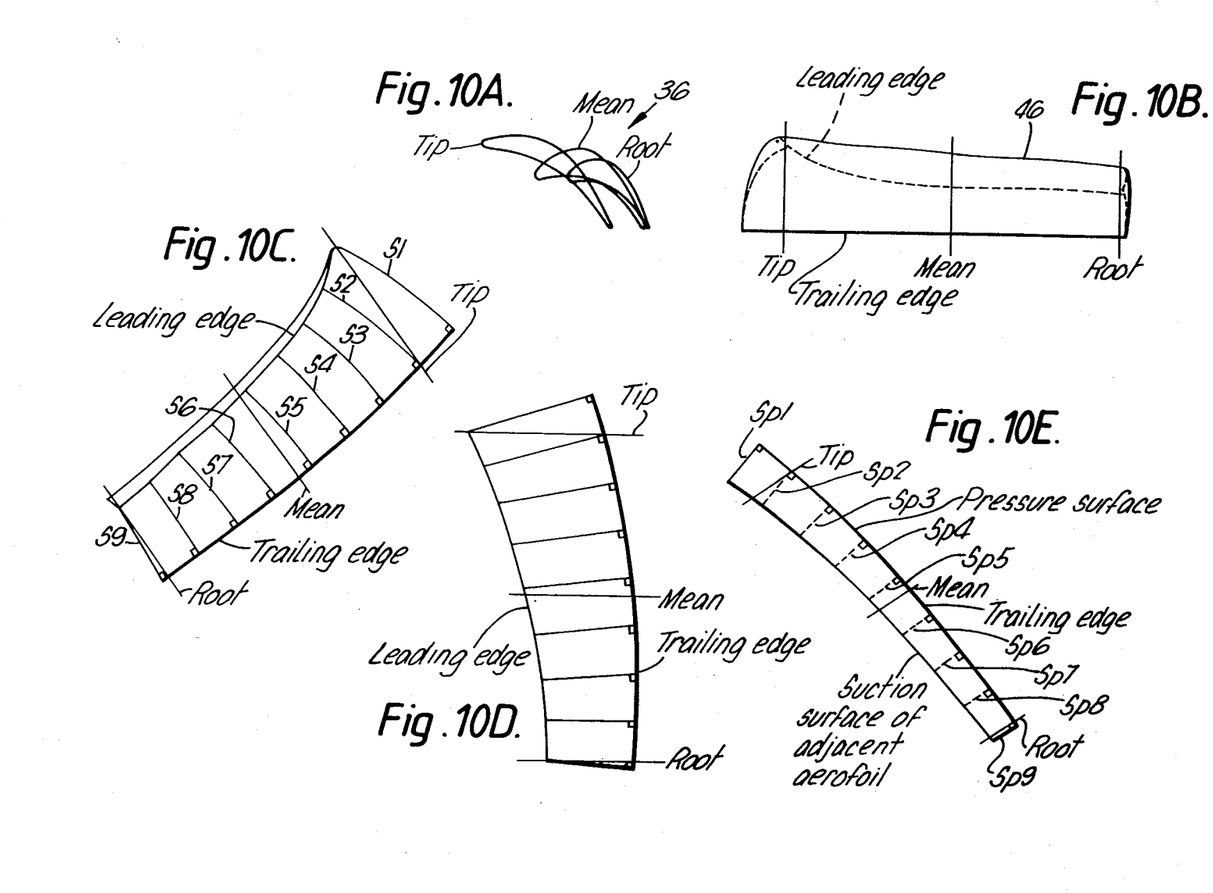
FIG. 10A is a plane view of three elemental aerofoil sections of an aerofoil according to the present inventon.
FIG. 10B is a rear elevation of the aerofoil shown in FIG. 10A.
FIG. 10C is a view of the aerofoil shown in FIG. 10A along a line parallel to the throat formed between two adjacent aerofoils.
FIG. 10D is a side elevation of the aerofoil shown in FIG. 10A.
FIG. 10E is a view normal to the throat between adjacent aerofoils one of which is shown in FIG. 10A.
Figures 10D, 11A, 11B, 11C, 11E:
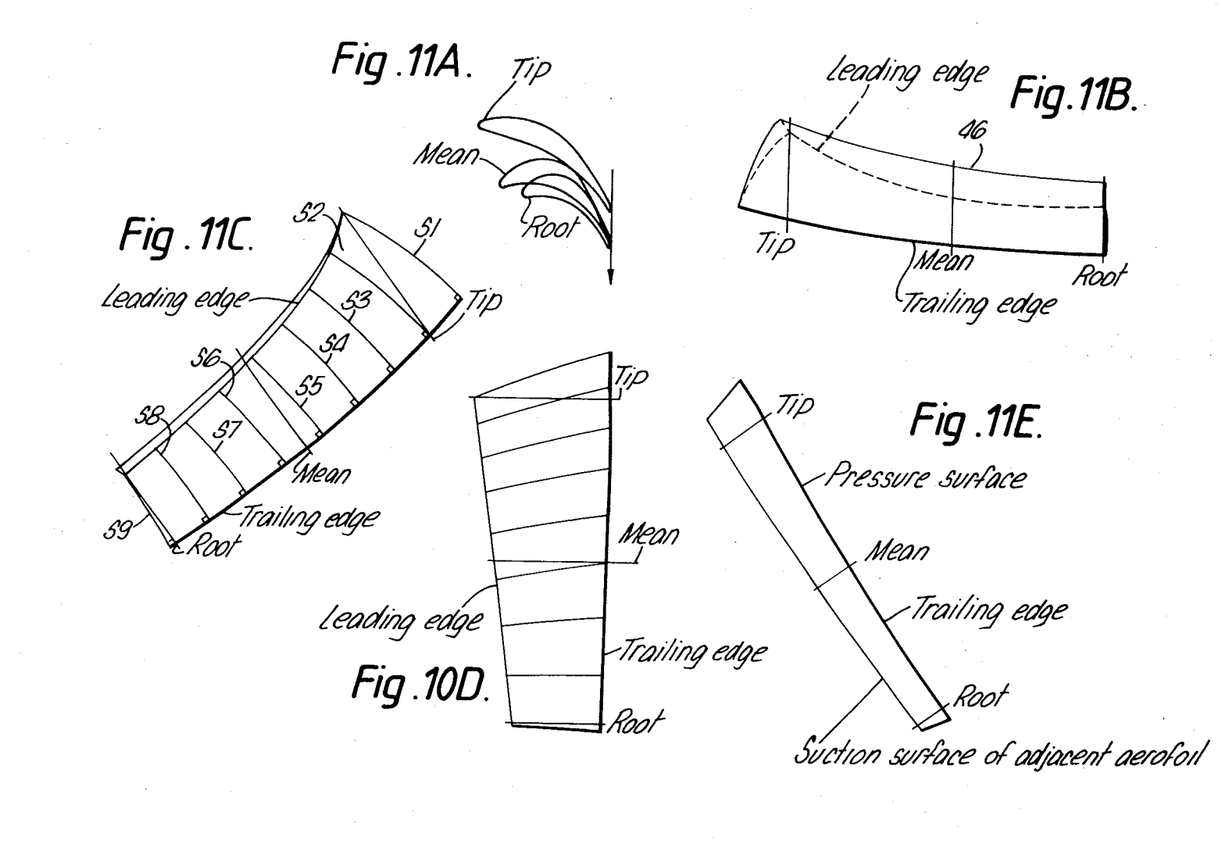
Figures 12A, 12B, 12C, 12D, 12E:
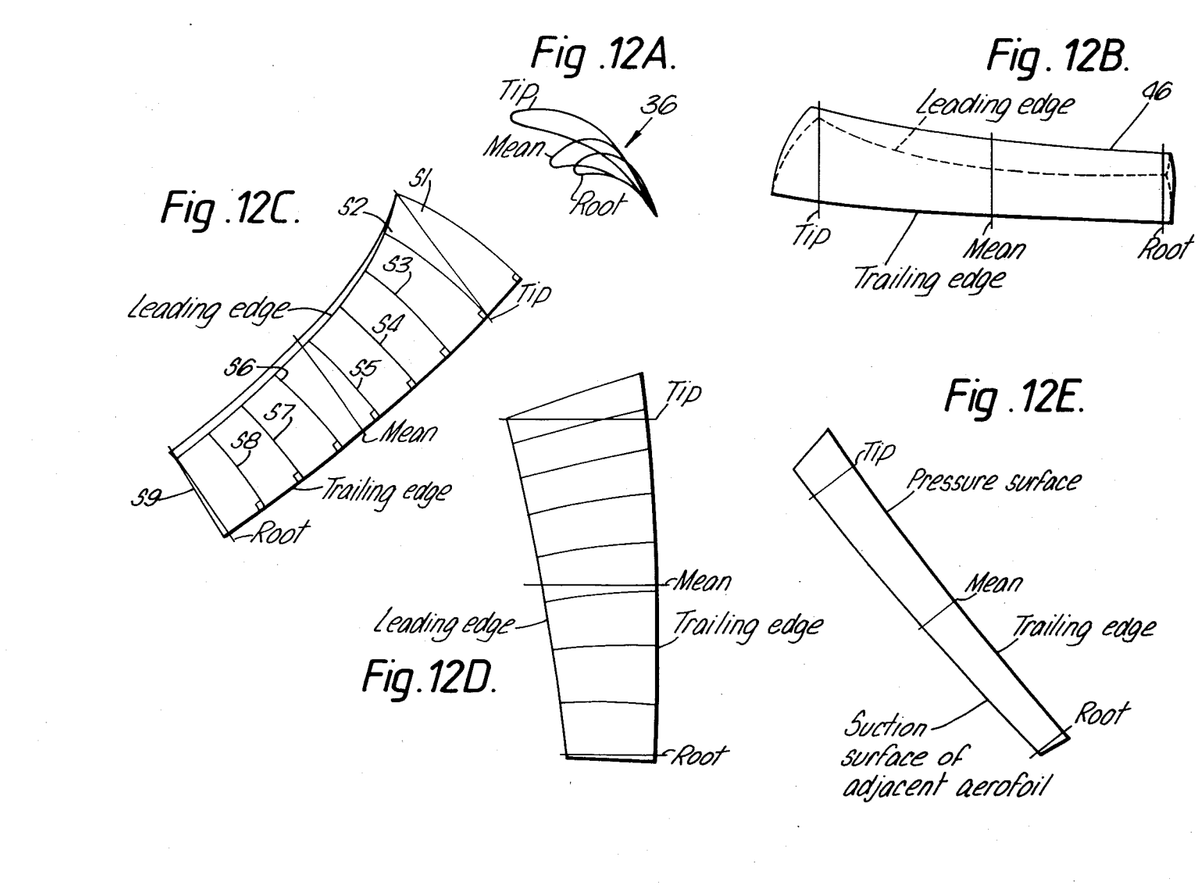

The aerofoil arrangement shown in FIG. 3 illustrates the present invention in a general form which satisfies the equation;

$$\tan\theta + \tan\lambda = \tan\alpha_p \cdot \tan\Phi$$

for all elements of the trailing edge, all embodiments of the present invention satisfying this equation. FIGS. 7 to 12 inclusive show in more detail specific examples of vanes according to the present invention. In particular FIGS. 10, 11 and 12 show three different methods of stacking the vane aerofoil section elements.

Figures 7, 8, 9:
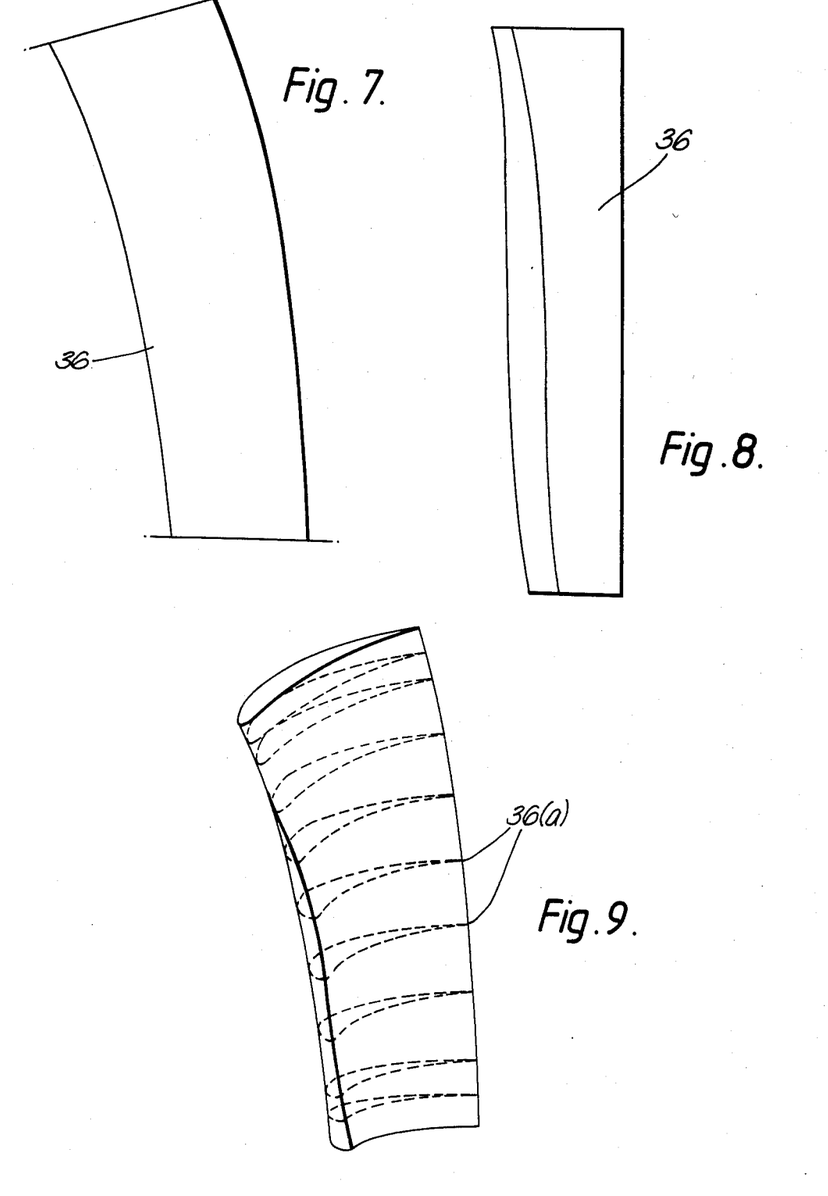
FIGS. 7, 8 and 9 show side and front elevations and a perspective view respectively of one of the aerofoils shown in FIG. 3.

FIGS. 7, 8 and 9 show three views of the most upstream stator vane 36 of the FIG. 3, FIG. 7 shows that the leading and trailing edges are both curved in the axial sense, whilst FIG. 8 shows that the trailing edge is straight over a substantial proportion of its length. FIG. 9 shows a perspective view of the vane which illustrates its complex shape and shows a number of elemental aerofoil sections 36a which are stacked to define the vane envelope. the method of stacking is shown in more detail in FIGS. 10A to 10E.

In FIG. 10A, three sections of the vane 36 are shown with their trailing edges stacked in a plane which passes through the engine axis of rotation, so that as shown in FIG. 10B, the trailing edge is a straight purely radially extending line when viewed in a direction along the engine axis. The vane sections shown are those at the root, at the mean height, and at the tip. These sections, and the intervening sections are stacked so that the trailing edge forms a curve as shown in FIG. 10C which is a view parallel to the throat between adjacent vanes. The lines $S_1$ to $S_9$ represent local streamlines of the gas flow and it will be seen that these streamlines are all normal to the trailing edge at the point of intersection.

The local streamlines also intersect the trailing edge normally when the vane is viewed in side elevation, as shown in FIG. 10D.

FIG. 10E is a view of the throat window between adjacent vanes in which the trailing edge bounds one side of the throat and the lines Sp1 to Sp9 represent streamplanes. In this arrangement, the streamplanes are also normal to the trailing edge, so that both of the conditions for complete trailing edge orthogonality (equations (1) and (2) are met.

In this arrangement, the tangential lean ($\Phi$) is zero for each element of the trailing edge. Also the axial lean ($\theta$) has a non-zero value, since both equations (1) and (2) are satisfied.

In contrast, the stacking arrangements of FIGS. 11A to 11E are such that there is a value of tangential lean ($\Phi$), although there is no axial lean ($\theta = 0$).

The trailing edges of the vane aerofoil sections are stacked along a line normal to the engine longitudinal axis. When the vane is viewed parallel to the throat between the vanes, as shown in FIG. 11C, the local streamlines of flow are normal at their intersections with the trailing edge, because $\Phi$ has been chosen to satisfy equation (1):
where $\theta = 0$
However, since $$\theta \neq -\lambda$$

the streamlines will not be normal to the trailing edge at their intersections as shown in FIG. 11D, and the streamplanes will not be normal to the trailing edge in the plane of the throat (FIG. 11E). Thus stream-sheet trailing edge orthogonality is not achieved using this method of stacking.

The elemental aerofoil sections can also be stacked so that the resulting vane has an axial lean and a radial lean, so that both $\theta$ and $\Phi$ have definite non zero values, and such an arrangement is shown in FIGS. 12A to 12E. The trailing edges of the aerofoil sections are stacked in a plane which lies between that plane which contains the engine axis and a plane normal to the engine axis.

The angles $\theta$ and $\Phi$ are chosen for each elemental section to satisfy equation (1) such that the steamlines $S_1$ and $S_9$ also will be normal to the trailing edge at their intersections (FIG. 12C).

Since $\Phi \neq 0$, the streamlines do not intersect the trailing edge at 90° when the vane is viewed in side elevation (FIG. 12D) and the streamplanes are not normal to the trailing edge in the plane of the throat (FIG. 12E).

Thus as with the previous arrangement, stream-sheet trailing edge orthogonality is not met. However, because the streamlines still intersect the trailing edge at 90°, it is believed that there will be some reduction in the secondary flows and some improvement in flow redistribution, and have an increase in component efficiency relative to a blade row.

The leading edges which does not embody this invention, of the aerofoils shown in FIGS. 10, 11 and 12 can be curved (FIG. 10) or straight, or substantially straight (FIGS. 11, 12) in order to obtain some orthogonality at the leading edge and/or at intervening positions between the leading and trailing edges.

The principle of orthogonality can be applied over part of the span of the aerofoil at the trailing edge or leading edge of obtain some localised performance improvement. Thus, part of the aerofoil trailing edge can be curved to meet either both of, or one of the orthogonality equations, whilst the remaining part or parts can be in a straight line or of any other shape. In such an aerofoil there will be some orthogonality violation. For example, the case illustrated in FIG. 2, the aerofoil has a straight trailing edge for which only the mean flow streamline is normal to the trailing edge at the point of intersection. This arrangement has been demonstrated to offer an improvement.

The invention can be applied to stator vanes nozzle guide vane, and to rotor blades.

We claim:

1. An aerofoil for a gas turbine engine, the aerofoil having an aerodynamic profile defined by a number of elemental aerofoil sections stacked relatively to one another, the elements of the aerofoil trailing edge between the elemental aerofoil sections being arranged to define at least partially, the trailing edge of the aerofoil, the aerofoil trailing edge forming one boundary of the geometric throat window between adjacent aerofoils in an array of aerofoils, an elemental length of said trailing edge extending perpendicular to the local streamlines of the gas flow passing through said throat window.

2. An aerofoil as claimed in claim 1 in which the elements of the trailing edge between the elemental aerofoil sections are stacked in a radial plane which contains the longitudinal axis of a gas turbine engine, the vane trailing edge being a straight line in a plane normal to the plane containing the engine longitudinal axis.

3. An aerofoil as claimed in claim 2 in which the trailing edge of the vane is curved in the spanwise direction in a plane containing the engine longitudinal axis.

4. An aerofoil as claimed in claim 2 in which, in the plane containing the geometric throat window, the concave or pressure surface of the aerofoil is curved in the spanwise direction and the convex or suction surface is curved in the spanwise direction.

5. An aerofoil as claimed in claim 2 in which streamplanes, when viewed in the plane of the geometric throat window are normal to each element of the aerofoil trailing edge at their points of intersection with the trailing edge.

6. An aerofoil as claimed in claim 1 in which the elements of the trailing edge between the elemental aerofoil sections are stacked in a plane normal to the engine longitudinal axis, the aerofoil trailing edge being substantially a straight line when viewed in a plane normal to the engine longitudinal axis.

7. An aerofoil as claimed in claim 1 in which the elements of the trailing edge of between the elemental aerofoil sections are stacked in any plane lying between a plane containing the engine longitudinal axis and a plane normal to the engine longitudinal axis.

8. A vane as claimed in claim 1 in which the aerofoil trailing edge is curved both in relation to a plane containing the engine longitudinal axis and a plane normal to the engine longitudinal axis.

9. An aerofoil as claimed in claim 1 in which the plane containing the geometric throat window between adjacent aerofoils, the concave or pressure surface of the aerofoil is curved in the spanwise direction and the convex, or suction surface is curved in the spanwise direction.

10. An aerofoil as claimed in claim 1 in which the leading edge of the aerofoil is a substantially straight radially extending line.

11. An aerofoil as claimed in any one of the preceeding claims 1 to 9 which the leading edge of the aerofoil is curved relative to two planes normal to one another, one of the said planes containing the longitudinal axis of the engine, the leading edge being normal to the incident flow.

12. A gas turbine engine including one or more aerofoils as claimed in claim 1, the aerofoils being arranged in a circumferential array to define the axial walls of a plurality of gas flow passages, the remaining inner and outer walls being defined either by symetrical surfaces of revolution or by assymetric surfaces, resulting in a non-cylindrical annulus.

13. A gas turbine engine as claimed in claim 12 in which the or each aerofoil comprises a turbine rotor blades.

14. A gas turbine engine as claimed in claim 12 in which the or each aerofoil comprises a turbine stator or nozzle guide vane.

15. An aerofoil for a gas turbine engine the aerofoil having an aerodynamic profile defined by a number of elemental aerofoil sections stacked relative to one another in which the elements of the aerofoil trailing edge between the aerofoil elements together form one boundary of a geometric throat window between adjacent aerofoils and substantially the whole span of the trailing edge is normal to the respective local flow stream lines at their points of intersection, the trailing edge elements being located in space according to the relationship, $$\tan\theta + \tan\lambda = \alpha p \cdot \tan\Phi,$$

where $\theta$ = local axial lean angle of the trailing edge $\lambda$ = local tangential lean angle of the trailing edge $\lambda$ = local radial angle of gas flow $\alpha p$ = local whirl angle in the plane of the gas flow.

16. An aerofoil as claimed in claim 15 in which $\theta = -\lambda$.

17. An aerofoil as claimed in claim 16 in which the geometric throat window between adjacent aerofoils is approximately rectangular when $\theta = -\lambda$, and $\Phi = 0$.

* * * * *

UNITED STATES PATENT AND TRADEMARK OFFICE
CERTIFICATE OF CORRECTION

PATENT NO.    :    4,714,407

DATED         :    December 22, 1987

INVENTOR(S)   :    COX, et al.

It is certified that error appears in the above-identified patent and that said Letters Patent is hereby corrected as shown below:

Column 8, line 65:

Change "$\tan\theta + \tan\lambda = \alpha p \cdot \tan\Phi$"

to

--$\tan\theta + \tan\lambda = \tan\alpha p \cdot \tan\Phi$--.

Signed and Sealed this

Seventeenth Day of September, 1996

Attest:

BRUCE LEHMAN

Attesting Officer          Commissioner of Patents and Trademarks